United States Patent
Wagner

(10) Patent No.: US 9,775,277 B2
(45) Date of Patent: Oct. 3, 2017

(54) OPERATING ENVIRONMENT OF AN AGRICULTURAL UTILITY VEHICLE

(71) Applicant: Deere & Company, Moline, IL (US)

(72) Inventor: Juergen Wagner, Darmstadt (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/265,874

(22) Filed: Sep. 15, 2016

(65) Prior Publication Data

US 2017/0000011 A1  Jan. 5, 2017

Related U.S. Application Data

(63) Continuation of application No. PCT/EP2015/055069, filed on Mar. 11, 2015.

(30) Foreign Application Priority Data

Mar. 18, 2014  (DE) ........................ 10 2014 204 974

(51) Int. Cl.
| | | |
|---|---|---|
| B60N 99/00 | (2006.01) | |
| A01B 76/00 | (2006.01) | |
| B60R 11/02 | (2006.01) | |
| B60K 35/00 | (2006.01) | |
| B60R 11/00 | (2006.01) | |

(52) U.S. Cl.
CPC ............. *A01B 76/00* (2013.01); *B60K 35/00* (2013.01); *B60R 11/0229* (2013.01); *B60R 11/0264* (2013.01); *B60K 2350/1028* (2013.01); *B60K 2350/925* (2013.01); *B60R 2011/0007* (2013.01); *B60R 2011/0022* (2013.01)

(58) Field of Classification Search
CPC  A01B 76/00; B60K 35/00; B60K 2350/1028; B60K 2350/925; B60R 11/0229; B60R 11/0264; B60R 2011/0007; B60R 2011/0022
See application file for complete search history.

(56) References Cited

U.S. PATENT DOCUMENTS

| | | |
|---|---|---|
| 2007/0103000 A1 | 5/2007 | Phillips et al. |
| 2011/0270469 A1 | 11/2011 | Bopp et al. |

FOREIGN PATENT DOCUMENTS

| | | |
|---|---|---|
| DE | 102006047020 B4 | 2/2014 |
| WO | 2012035522 A3 | 3/2012 |
| WO | 2012110020 A1 | 8/2012 |

OTHER PUBLICATIONS

The International Preliminary Report on Patentability of the International Searching Authority issued in counterpart application No. PCT/EP15/055069, dated May 13, 2015 (4 pages).
The International Search Report and the Written Opinion of the International Searching Authority issued in counterpart application No. PCT/EP15/055069, dated Sep. 29, 2016 (12 pages).

*Primary Examiner* — Lori L Lyjak

(57) ABSTRACT

An operating environment of an agricultural utility vehicle having a graphical user interface includes a freely configurable display or control unit. The display or control unit can, as desired, be mounted at a first mounting interface for providing a first display or control configuration in a first driver field of vision, or at a second mounting interface for providing a second display or control configuration in a second driver field of vision.

8 Claims, 1 Drawing Sheet

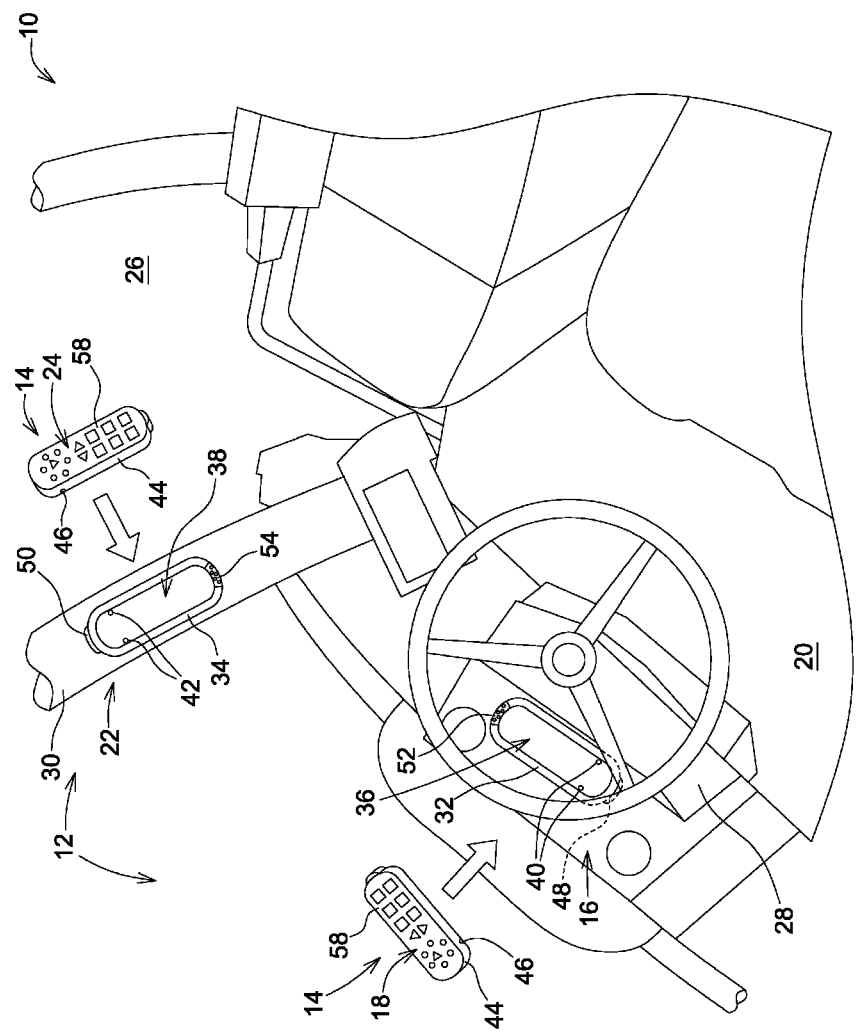

OPERATING ENVIRONMENT OF AN AGRICULTURAL UTILITY VEHICLE

RELATED APPLICATIONS

This application is a continuation application of International Application Serial No. PCT/EP2015/055069, which has an international filing date of Mar. 11, 2015, and which claims the benefit of German Application Ser. No. 102014204974.1, filed on Mar. 18, 2014. The disclosures of these aforementioned applications are hereby expressly incorporated by reference in their entirety.

FIELD OF THE DISCLOSURE

The present disclosure relates to an agricultural utility vehicle, and in particular, to an operating environment of an agricultural utility vehicle having a graphical user interface.

BACKGROUND

Graphical user interfaces, which typically consist of a display unit with an associated control panel, are becoming increasingly more important in agricultural utility vehicles for monitoring or control of complex work functions, as well as for supervision of vehicle-related data. In this regard, the graphical user interface is disposed, for example, in the region of a central control console within a vehicle cabin of the agricultural utility vehicle. Alternatively, mounting in the region of a front side cabin pillar (A-pillar) is conventional. The mounting site of the graphical user interface, which is fixed in both cases, can result in the interface not being in the field of vision of the driver or vehicle operator, depending upon what he or she is doing. In particular, when multiple or complex steering tasks are selected, this can involve an undesirable loss of driver comfort.

In this disclosure, an operating environment enables an improvement of driver comfort even when multiple or complex steering tasks are selected.

SUMMARY

The operating environment of an agricultural utility vehicle according to the disclosure with a graphical user interface includes a freely configurable display or control unit, where the display or control unit can, as desired, be mounted at a first mounting interface to provide a first display or control configuration in a first driver field of vision, or at a second mounting interface to provide a second display or control configuration in a second driver field of vision. In this way, the display or control unit can be mounted at different points within the operating environment, namely in the field of vision of the driver in each case, where, because of the free configurability, different display contents or control ranges that are matched to the relevant control tasks of the driver can be presented for each of the two mounting types.

The operating environment is in particular the interior space of a vehicle cabin disposed on an agricultural utility vehicle. One use of the disclosure suggests itself in particular in connection with agricultural tractors, since here one can expect the greatest variety or complexity of control tasks that are selected by the driver because of the wide-ranging capabilities of the tractor.

The first mounting interface is associated with a central control console and the second mounting interface is associated with a cabin side pillar of the operating environment. In this way, when traveling on a road, thus when the view of the driver is directed forward in the direction of the road course, the display or control unit can be mounted at the first mounting interface in the region of the central control console that is intended to steer the agricultural utility vehicle. If, on the other hand, the view of the driver is directed to the side, which is typically the case during soil cultivation using an implement disposed at the rear of the agricultural utility vehicle, a mounting of the display or control unit at the second mounting interface in the region of one of the front side cabin pillars is provided. Most often this means one of the two front side cabin pillars (A-pillars), since experience indicates that the view of the driver constantly sweeps back and forth between the field lying ahead and the implement disposed at the rear. Thus, the A-pillar lies roughly in the middle of the field of vision swept by the driver.

In addition, there is the possibility that the central control console or the side cabin pillar has a contour for at least a partial form-fit accommodation of the display or control unit, so that the unit can be pleasantly integrated into the operating environment of the agricultural utility vehicle by design.

Moreover, the first or second mounting interface can be designed as a mechanical mount. The mechanical mount can, for example, include a fastening means for making a releasable snap-lock connection with the display or control unit. In addition, the mechanical mount can have a fixed electrical connector that communicates with a data bus of the agricultural utility vehicle, the connector being connectable to a complementary electrical connector formed on the housing of the display or control unit to produce a data exchange connection.

It should be noted that it is also possible for the display or control unit to communicate wirelessly with the data bus of the agricultural utility vehicle via a Bluetooth connection, so that a use of electrical connectors, along with the related cabling expenditures, becomes unnecessary.

In particular, it is conceivable that the deployment of the first display or control configuration takes place automatically upon mounting the display or control unit at the first mounting interface, or that the deployment of the second display or control configuration takes place automatically upon mounting the display or control unit at the second mounting interface. Accordingly, the display contents or control ranges presented via the display or control unit can be matched to the control tasks selected by the driver without the involvement of the driver. For example, a display of information relevant to carrying out road travel can take place if the display or control unit is mounted at the first mounting interface in the region of the central control console. Conversely, if the display or control unit is mounted at the second mounting interface in the region of the cabin side pillar, a display of information referring to the soil cultivation operation can be provided, and it can be modified appropriately in correspondence with the implement that is used.

The display or control unit may be made as a touch screen. The touch screen can be horizontally or vertically mountable at the first or second mounting interface, where the orientation of the presented display information or an overlaid control panel is appropriately adjusted. In the sense of improved multitasking, the touch screen can be a component of a commercial tablet computer, which at the same time takes on the jobs of data storage and processing. In a different configuration, a pure display unit in the form of a TFT display or the like can also be provided instead of a touch screen. In this case, the control of the work function that is to be controlled by the driver takes place via a separate control panel, whose function likewise can be freely configurable.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

The FIGURE shows a schematic of an operating environment of an agricultural utility vehicle having a graphical user interface.

DETAILED DESCRIPTION

In the example of the FIGURE, the operating environment 10 is the interior space of a driver cabin disposed on the agricultural tractor, where the graphical user interface 12 includes a freely configurable display or control unit 14.

The same display or control unit 14 is shown twice in the FIGURE, where the display or control unit 14 can be mounted, as desired, at a first mounting interface 16 to provide a first display or control configuration 18 in a first driver field of vision 20, or at a second mounting interface 22 to provide a second display or control configuration 24 in a second driver field of vision 26, as indicated by the relevant arrows.

More precisely, the first mounting interface 16 is associated with a central control console 28 and the second mounting interface 22 is associated with a front side cabin pillar 30 (A-pillar) of the operating environment 10. Both the central control console 28 and the front side cabin pillar 30 have a contour 32, 34 for at least a partial form-fit accommodation of the display or control unit 14. The contour 32, 34, which makes a pan-shaped recess, is a component of a mechanical mount 36, 38 for holding the display or control unit 14 and that forms the first mounting interface 16 or the second mounting interface 22. The mechanical mount 36, 38 comprises a fastening means 40, 42 to produce a releasable snap-lock connection with the display or control unit 14 in the form of two spring-loaded latches, which can be brought into engagement with complementary recesses 46 on a housing 44 when the display or control unit 14 is put into place. A gripping recess 48, 50 facilitates a removal of the display or control device 14 from the mechanical mount 36, 38.

In addition, a fixed electrical connector 52, 54, which communicates with a data bus (not shown) of the agricultural tractor, which can be brought into contact with a complementary electrical connector 58, is formed on the housing of the display or control unit 14 to produce a data exchange connection. The electrical connector 58 that is fixed on the housing is disposed on the side of the housing 44 of the display or control unit 14 so that the contact with the relevant fixed electrical connector 52, 54 is automatically made when the display or control unit 14 is placed in the mechanical mount 36, 38. Various vehicle and work function related data are made available via the data bus and these data are converted by the display or control unit 14, which is made as a touch screen 58, into the correspondingly presented display contents according to the display or control configuration 18, 24 and can be used by the driver to monitor or control pertinent work functions via an overlaid control panel.

As can be seen from the FIGURE, the touch screen 58 or the display or control unit 14 formed by it can be mounted horizontally at the first mounting interface 16 and vertically at the second mounting interface 22, and the orientation of the presented display contents or the incorporated control panel will be adjusted accordingly.

In general, during road travel, thus when the view of the driver is chiefly directed forward in the direction of the road, the display or control unit 14 will be mounted at the first mounting interface 16 in the region of the central control console 28 that is provided for steering the agricultural tractor. If, on the other hand, the view of the driver is chiefly directed to the side, which is typically the case when cultivating soil by means of an implement disposed at the rear of the agricultural tractor, the display or control unit 14 can be mounted at the second mounting interface 22 in the region of the front side cabin pillar 30.

In this way, the display or control unit 14 can be mounted in various places within the operating environment 10, namely in each of the fields of vision of the driver, and different display or control configurations 18, 24 matched to the relevant control tasks of the driver are presented for each of the two mounting types.

In the present case, the deployment of the first display or control configuration 18 takes place automatically upon mounting the display or control unit 14 at the first mounting interface 16, while the deployment of the second display or control configuration 24 takes place automatically upon mounting the display or control unit 14 at the second mounting interface 22, consequently, on putting the display or control unit 14 into the relevant mechanical mount 36, 38. Correspondingly, the display contents or control range presented via the display or control unit 14 is matched specifically, and without involvement of the driver, to the control tasks that are selected by him.

A display of information relevant for conducting road travel takes place correspondingly, provided the display or control unit 14 is inserted into the mechanical mount 36 in the region of the central control console 28. Conversely, when the display or control unit 14 is inserted into the mechanical mount 38 in the region of the front side cabin pillar 30, a display of information relating to the soil cultivation is provided, and it is appropriately modified according to the implement that is used.

Alternatively, the display or control unit 14 replaces the main display instruments that are usually provided in the region of the control console 28 such as the tachometer, oil gauge, engine temperature gauge, blinker direction indicator, and the like. These display contents are then presented by the display or control unit 14 both when mounted at the first and also at the second mounting interface 16, 22, so that the driver is always informed regarding all of the parameters of the agricultural tractor that are relevant to its operation. However, in each case according to the mounting point of the display or control unit 14, the display contents or control ranges that are additionally presented are matched to the relevant control tasks of the driver.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An operating environment of an agricultural utility vehicle having a graphical user interface, comprising:
   a freely configurable display or control unit;
   a first mounting interface; and
   a second mounting interface;
   wherein, the display or control unit is mountable at the first mounting interface to provide a first display or control configuration in a first driver field of vision, or at the second mounting interface to provide a second display or control configuration in a second driver field of vision, and the display or control unit comprises a touch screen.

2. The operating environment of claim 1, wherein the first mounting interface is associated with a central control console, and the second mounting interface is associated with a side cabin pillar.

3. The operating environment of claim 2, wherein the central control console or the side cabin pillar includes a contour for at least a partial form-fit accommodation of the display or control unit.

4. The operating environment of claim 1, wherein the first or second mounting interface comprises a mechanical mount.

5. The operating environment of claim 4, wherein the mechanical mount comprises a fixed electrical connector configured to be in communication with a data bus of the agricultural utility vehicle, the electrical connector being connectable with a complementary fixed electrical connector on the display or control unit to produce a data exchange connection.

6. The operating environment of claim 1, wherein the deployment of the first display or control configuration is executed automatically upon mounting the display or control unit at the first mounting interface, or that the deployment of the second display or control configuration is executed automatically upon mounting the display or control unit at the second mounting interface.

7. An operating environment of an agricultural utility vehicle having a graphical user interface, comprising:
   a freely configurable display or control unit;
   a first mounting interface; and
   a second mounting interface;
   wherein, the display or control unit is mountable at the first mounting interface associated with a central control console to provide a first display or control configuration in a first driver field of vision, or at the second mounting interface associated with a side cabin pillar to provide a second display or control configuration in a second driver field of vision.

8. An operating environment of an agricultural utility vehicle having a graphical user interface, comprising:
   a freely configurable display or control unit;
   a first mounting interface; and
   a second mounting interface;
   wherein, the display or control unit is mountable at the first mounting interface to provide a first display or control configuration in a first driver field of vision, or at the second mounting interface to provide a second display or control configuration in a second driver field of vision; and
   wherein the deployment of the first display or control configuration is executed automatically upon mounting the display or control unit at the first mounting interface, or that the deployment of the second display or control configuration is executed automatically upon mounting the display or control unit at the second mounting interface.

* * * * *